United States Patent [19]
Kato et al.

[11] Patent Number: 5,600,949
[45] Date of Patent: Feb. 11, 1997

[54] EXHAUST GAS-PURIFYING SYSTEM FOR INTERNAL COMBUSTION ENGINES

[75] Inventors: Hiroaki Kato; Yuichi Shimasaki; Akihisa Saito; Takashi Komatsuda; Toshikazu Oketani; Seiji Hatcho; Seiji Matsumoto; Takuya Aoki; Yukio Miyashita, all of Wako, Japan

[73] Assignee: Honda Giken Kogyo Kabushiki Kaisha, Tokyo, Japan

[21] Appl. No.: 299,116

[22] Filed: Sep. 2, 1994

[30] Foreign Application Priority Data

Sep. 6, 1993 [JP] Japan ................................. 5-245927

[51] Int. Cl.$^6$ ........................................................ F01N 3/28
[52] U.S. Cl. .............................. 60/284; 60/285; 60/286; 60/300
[58] Field of Search ........................... 60/284, 285, 286, 60/300

[56] References Cited

U.S. PATENT DOCUMENTS

| 3,732,696 | 5/1973 | Masaki | 60/284 |
| 5,263,318 | 11/1993 | Oota | 60/284 |
| 5,321,231 | 6/1994 | Schmalzriedt | 60/284 |

FOREIGN PATENT DOCUMENTS 48-54312  7/1973  Japan .

*Primary Examiner*—Douglas Hart
*Attorney, Agent, or Firm*—Nikaido, Marmelstein, Murray & Oram LLP

[57] ABSTRACT

An exhaust gas-purifying system for an internal combustion engine includes a catalyzer arranged in the exhaust system of the engine. The catalyzer is provided with a heater for heating the same. An ECU controls the operation of the heater. The ECU is responsive to operating conditions of the engine detected by engine operating parameter sensors, for restraining the operation of the heater.

9 Claims, 2 Drawing Sheets

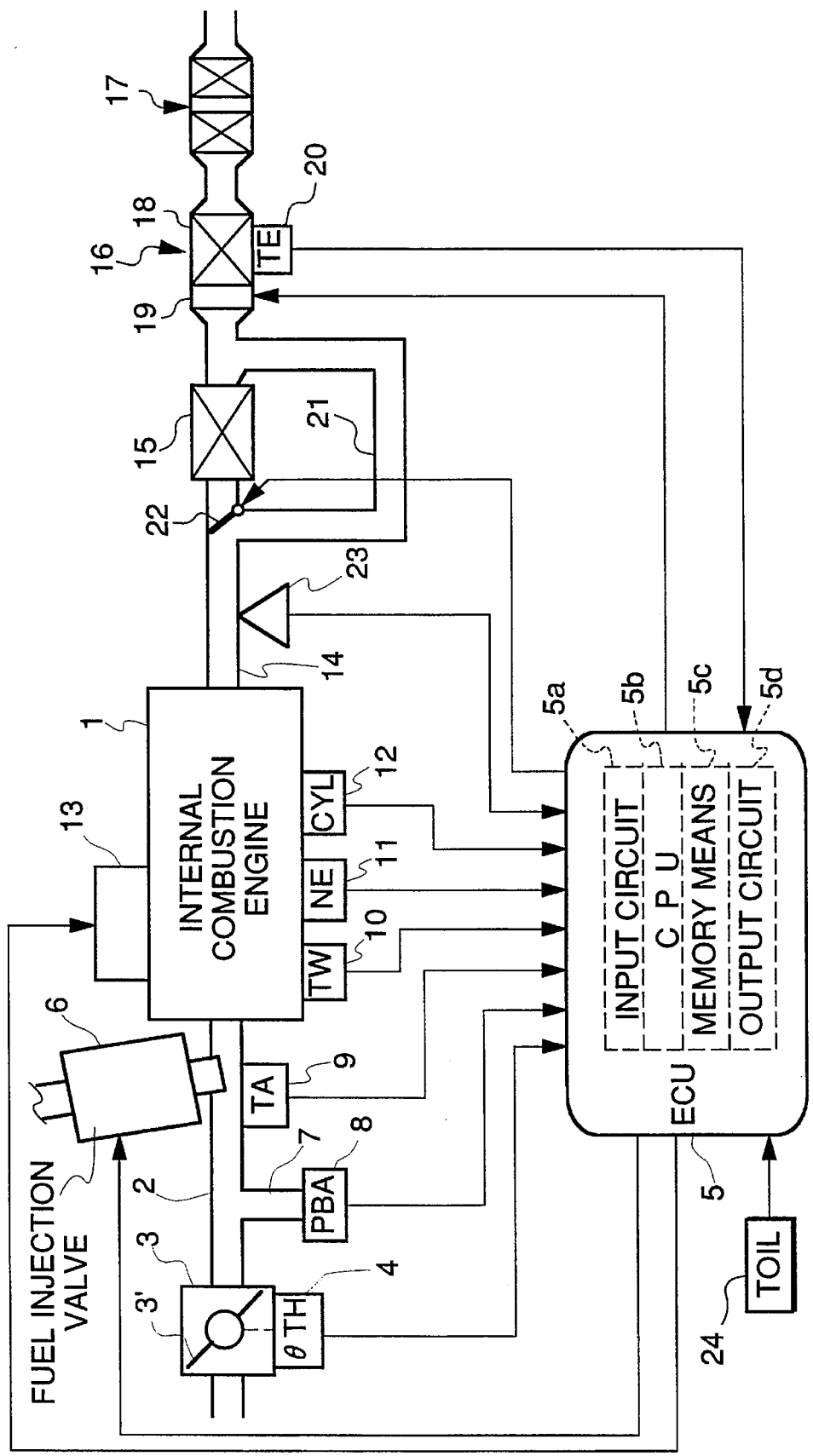

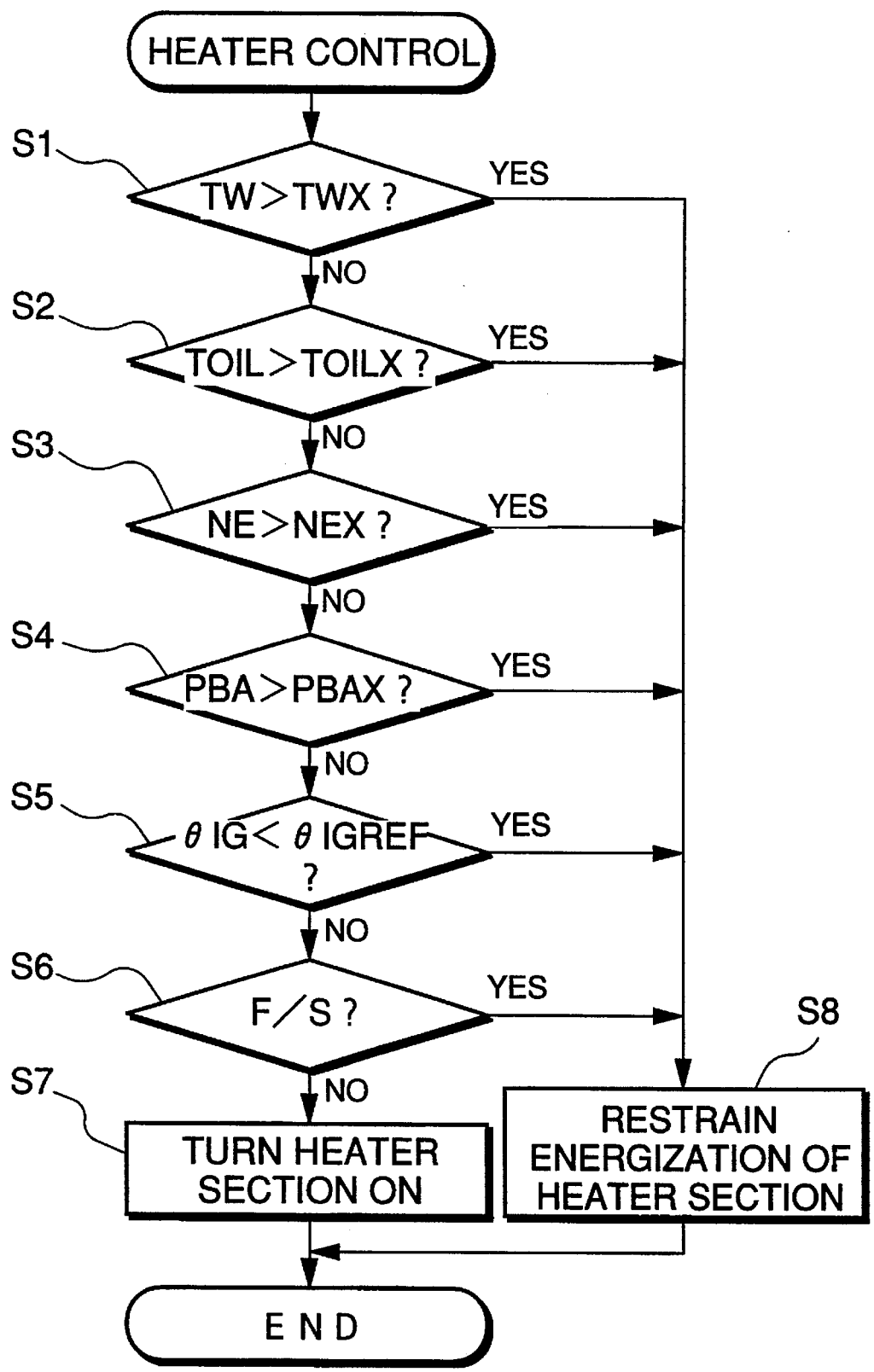

EXHAUST GAS-PURIFYING SYSTEM FOR INTERNAL COMBUSTION ENGINES

BACKGROUND OF THE INVENTION

1. Field of the Invention

This invention relates to an exhaust gas-purifying system for internal combustion engines.

2. Prior Art

In the technical field of internal combustion engines, it is well known that a catalyzer (three-way catalyst) is arranged in the exhaust system of the engine, for purifying noxious components, such as HC, CO, and NOx present in exhaust gases emitted from the engine. However, the above catalyzer is not activated until it is warmed up to a temperature exceeding a predetermined value, which means that the catalyzer does not perform a desired catalytic action before its temperature exceeds the predetermined value. It is therefore necessary to promptly activate the catalyzer by positively heating same when it is not warmed up, on such an occasion as the start of the engine.

To achieve early activation of a catalyzer by promptly elevating the temperature thereof, a catalyzer provided with an electric heater has been proposed, for example, by Japanese Provisional Patent Publication (Kokai) No. 48-54312.

in the above proposed conventional catalyzer with an electric heater, however, if the electric heater is operated when the engine is in a high load operating condition, such as a condition under which a throttle valve arranged in the intake pipe of the engine is fully open, the catalyzer is exposed to a high temperature atmosphere, resulting in deterioration of the converter and the electric heater due to heating, to thereby shorten the durability or effective lives thereof.

Besides, the electric heater provided for the above conventional catalyzer is required to have relatively large electric capacity. However, the technique of controlling an electric heater of this kind has not been established yet, and therefore, if an electric heater of this kind is mounted in automotive vehicles, it cannot exhibit satisfactory practical performance, in respect of heating efficiency, power consumption, etc.

SUMMARY OF THE INVENTION

It is the object of the invention to provide an exhaust gas-purifying system for internal combustion engines, which is capable of improving the durability of a catalyzer and an electric heater provided therefor, while optimizing the heating efficiency and power consumption.

To attain the above object, the present invention provides an exhaust gas-purifying system for an internal combustion engine having an exhaust system, comprising:

catalyzer means arranged in the exhaust system;

heater means disposed to heat the catalyzer means;

heater control means for controlling operation of the heater means; and operating condition-detecting means for detecting operating conditions of the engine;

wherein the heater control means comprises operation-restraining means responsive to operating conditions of the engine detected by the operating condition-detecting means, for restraining operation of the heater means.

Preferably, the operating condition-detecting means includes engine temperature-detecting means for detecting a temperature of the engine, the operation-restraining means restraining the operation of the heater means when the temperature of the engine detected by the engine temperature-detecting means exceeds a predetermined value.

More preferably, the engine temperature-detecting means comprises coolant temperature-detecting means for detecting temperature of coolant in the engine, and/or hydraulic oil temperature-detecting means for detecting temperature of hydraulic oil in the engine.

Advantageously, the hydraulic oil is a hydraulic oil used to operate at least one intake valve and at least one exhaust valve of the engine.

Also preferably, the operating condition-detecting means includes rotational speed-detecting means for detecting rotational speed of the engine, the operation-restraining means restraining the operation of the heater means when the rotational speed of the engine detected by the rotational speed-detecting means exceeds a predetermined value.

Further preferably, the operating condition-detecting means includes load-detecting means for detecting load on the engine, the operation-restraining means restraining the operation of the heater means when the load on the engine detected by the rotational speed-detecting means exceeds a predetermined value.

Preferably, the heater control means includes second operation-restraining means for restraining the operation of the heater means when the ignition timing of the engine is controlled by the ignition timing control means to a value on a retarded side relative to a predetermined value.

The first-mentioned and second operation-restraining means may comprise either operation-inhibiting means for inhibiting the operation of the heater means, or operation efficiency-reducing means for reducing operation efficiency of the heater means.

The above and other objects, features, and advantages of the invention will be more apparent from the following detailed description taken in conjunction with the accompanying drawings.

BRIEF DESCRIPTION OF THE DRAWINGS

FIG. 1 is a block diagram schematically showing the whole arrangement of an internal combustion engine and an exhaust gas-purifying system therefor, according to an embodiment of the invention; and FIG. 2 is a flowchart showing a program for controlling an electric heater provided for a catalyzer.

DETAILED DESCRIPTION

The invention will now be described in detail with reference to the drawings showing an embodiment thereof.

Referring first to FIG. 1, there is shown the whole arrangement of an internal combustion engine and an exhaust gas-purifying system therefor, according to an embodiment of the invention.

In the figure, reference numeral 1 designates a DOHC straight type four-cylinder internal combustion engine (hereinafter referred to as "the engine"), each cylinder being provided with a pair of intake valves and a pair of exhaust valves, not shown. In an intake pipe 2 of the engine 1, there is arranged a throttle body 3 accommodating a throttle valve 3' therein. A throttle valve opening (θTH) sensor 4 is connected to the throttle valve 3', for generating an electric signal indicative of the sensed throttle valve opening and supplying the same to an electronic control unit (hereinafter referred to as "the ECU") 5.

Fuel injection valves 6, only one of which is shown, are inserted into the interior of the intake pipe 2 at locations intermediate between the engine 1 and the throttle valve 3'. The fuel injection valves 6 are connected to a fuel pump, not shown, and electrically connected to the ECU 5 to have their valve opening periods controlled by signals therefrom.

An intake pipe absolute pressure (PBA) sensor 8 is provided in communication with the interior of the intake pipe 2 via a conduit 7 opening into the intake pipe 2 at a location downstream of the throttle valve 3', for supplying an electric signal indicative of the sensed absolute pressure PBA within the intake pipe 2 to the ECU 5.

An intake air temperature (TA) sensor 9 is mounted in the wall of the intake pipe 2 at a location downstream of the conduit 7, for supplying an electric signal indicative of the sensed intake air temperature TA to the ECU 5.

An engine coolant temperature (TW) sensor 10, which may be formed of a thermistor or the like, is inserted into a coolant passage filled with a coolant and formed in the cylinder block, for supplying an electric signal indicative of the sensed engine coolant temperature TW to the ECU 5.

Further, an engine rotational speed (NE) sensor 11 and a cylinder-discriminating (CYL) sensor 12 are arranged in facing relation to a camshaft or a crankshaft of the engine 1, neither of which is shown.

The NE sensor 11 generates a pulse as a TDC signal pulse at each of predetermined crank angles whenever the crankshaft rotates through 180 degrees, while the CYL sensor 12 generates a pulse as a CYL signal pulse at a predetermined crank angle of a particular cylinder of the engine, both of the pulses being supplied to the ECU 5.

Each cylinder of the engine 1 has a spark plug 13 electrically connected to the ECU 5 to have its ignition timing controlled by a signal therefrom.

Further, an adsorbing device 15, a first catalyzer 16 and a second catalyzer 17 are serially arranged in an exhaust pipe 14 extending from the cylinder block of the engine 1.

The adsorbing device 15 accommodates therein an adsorbent formed of zeolite or the like, by which an unburnt gas component (HC) present in exhaust gases is adsorbed when the exhaust gases are at a low temperature. When the temperature of the exhaust gases exceeds a predetermined value (e.g. 200° C.), the unburnt gas component is desorbed from the adsorbing device 15, and then purged to the first and second catalyzers 16 and 17.

The first catalyzer 16 is comprised of a three-way catalyst section 18 and a heater section 19, and its operation is controlled by a signal from the ECU 5. Specifically, the heater section 19 operates to heat the first catalyzer 16 when the engine is started at a low temperature except for a case when the temperature is extremely low (e.g. −20° C. or below) or the voltage of a battery, not shown, for supplying operating voltage exclusively to the heater section 19, or to both the heater section and electric component parts of the engine is low. The heater section 19 is controlled by the ECU 5 so as to achieve prompt activation of the first catalyzer 16. Thus, exhaust gas purification can be achieved even when the engine is started in a cold state, leading to improved exhaust emission characteristics of the engine in a cold state.

The first catalyzer 16 is provided with a catalyst temperature (TE) sensor 20 mounted therein, which is electrically connected to the ECU 5, for supplying an electric signal indicative of the sensed catalyst temperature TE to the ECU 5.

The second catalyzer 17 is comprised of a three-way catalyst being larger in capacity than the first catalyzer 16. The second catalyzer 17 operates mainly after the engine has been warmed up, to purify noxious components, such as HC, CO, and NOx present in exhaust gases.

A bypass passage 21 extends from the exhaust pipe 14 in a fashion bypassing the adsorbing device 15, with an upstream end thereof being connected to the exhaust pipe 14 to form a branchpoint together therewith. Further, a passage changeover valve 22 is arranged in the exhaust pipe 14 at the upstream end of the bypass passage 21 or at the branchpoint. The passage changeover valve 22 is electrically connected to the ECU 5, and controlled thereby such that exhaust gases emitted from the engine 1 are guided through the bypass passage 21 to the first catalyzer 16 after the temperature of the first catalyzer 16 sensed by the TE sensor 20 has risen up to a predetermined temperature to indicate completion of activation of the first catalyzer 16. Thus, it is possible to prevent the adsorbing device 15 from being exposed to a high temperature atmosphere after the engine has been warmed up, to thereby avoid degraded durability thereof.

Arranged in the exhaust pipe 14 at a location upstream of the adsorbing device 15 is an oxygen concentration sensor 23 (hereinafter referred to as "the O2 sensor"). The O2 sensor 23 has a sensor element formed of a zirconia solid electrolyte ($ZrO_2$), having a property that an electromotive force thereof drastically changes as the air-fuel ratio of exhaust gases changes across a stoichiometric air-fuel ratio. Accordingly, an output signal from the O2 sensor 23 is inverted from a lean state to a rich state with respect to the stoichiometric air-fuel ratio or vice versa as the air-fuel ratio crosses the stoichiometric ratio. Specifically, the output signal from the O2 sensor 23 indicates a high level when the exhaust gases are rich, and a low level when they are lean, respectively. The output signal from the O2 sensor 23, thus being indicative of the sensed O2 concentration, is supplied to the ECU 5.

Further connected to the ECU 5 is a hydraulic oil temperature (TOIL) sensor 24 for detecting the temperature of a hydraulic oil for operating the intake and exhaust valves of the engine, and supplying a signal indicative of the sensed hydraulic temperature TOIL to the ECU 5.

The ECU 5 is comprised of an input circuit 5a having the function of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c storing various operational programs which are executed by the CPU 5b and for storing results of calculations therefrom, etc., and an output circuit 5d which outputs driving signals to the fuel injection valves 6, heater section 19, passage changeover valve 22, etc.

The CPU 5b operates in response to the above-mentioned signals from the sensors to determine operating conditions in which the engine 1 is operating, such as an air-fuel ratio feedback control region in which air-fuel ratio control is carried out in response to oxygen concentration in exhaust gases, and open-loop control regions, and calculates, based upon the determined engine operating conditions, a valve opening period or fuel injection period TOUT over which the fuel injection valves 6 are to be opened in synchronism with generation of TDC signal pulses, by the use of the following equation (1):

$$Tout = Ti \times KO2 \times K1 + K2 \qquad (1)$$

where Ti represents a basic value of the fuel injection period Tout, which is determined according to engine operating parameters, such as the engine rotational speed NE and the intake pipe absolute pressure PBA indicative of load on the engine, by the use of a Ti map, not shown, which is stored in the memory means 5c.

KO2 represents an air-fuel ratio correction coefficient calculated based on the output signal from the O2 sensor 23, which is set to such a value that the air-fuel ratio (oxygen concentration) detected by the O2 sensor 23 becomes equal to a desired value when the engine 1 is operating in the air-fuel ratio feedback control region, while it is set to predetermined values corresponding to the respective open-loop control regions of the engine 1 when the engine 1 is in the open-loop control regions.

K1 and K2 represent other correction coefficients and correction variables, respectively, which are set according to engine operating parameters to such values as optimize engine operating characteristics, such as fuel consumption and engine accelerability.

Further, the CPU 5b calculates an ignition timing advance value $\theta IG$ to determine the ignition timing of the engine in response to engine parameter signals form various sensors as mentioned above, by the use of the following equation (2):

$$\theta IG = \theta IGMAP - \theta IGR \quad (2)$$

where $\theta IGMAP$ represents a basic value of the ignition timing advance $\theta IG$, which is determined according to operating conditions of the engine, such as the engine rotational speed NE and the intake pipe absolute pressure PBA indicative of load on the engine, by the use of a $\theta IGMAP$ map, not shown, stored in the memory means 5c. $\theta IGR$ represents an ignition timing advance-correction value which is set to predetermined values corresponding to operating conditions of the engine.

FIG. 2 shows a program for controlling the operation of the heater section 19 of the first catalyzer 16, which is executed, for example, in synchronism with generation of TDC signal pulses.

First, at a step, it is determined whether or not the engine coolant temperature TW exceeds a predetermined value TWX (e.g. 75° C.), and then at a step S2, it is determined whether or not the hydraulic oil temperature TOIL of the oil for operating the intake and exhaust valves exceeds a predetermined value TOILX (e.g. 80° C.). If the answer at either the step S1 or the step S2 is affirmative (YES), it is determined that the engine has been warmed up so that the first and second catalyzers 16 and 17 have been activated, and then the program proceeds to a step S8, wherein energization of the heater section 19 is restrained. More specifically, in the present loop of execution of the program, the first and second catalyzers 16 and 17 have been activated, which means that the first catalyzer 16 does not require heating by the heater section 19, and therefore the supply of electric power from the battery to the heater section 19 for energization of the same is interrupted or the supply rate of the electric power is lowered relative to a value required normally when the engine is in a cold state, to thereby save the power consumption by inhibiting the operation of the heater section 19 or reducing the operation efficiency of same.

On the other hand, if both of the answers to the questions at the steps S1 and S2 are negative (NO), it is determined that the engine has not been warmed up yet, followed by the program proceeding to a step S3, wherein it is determined whether or not the engine rotational speed NE exceeds a predetermined value NEX (e.g. 4000 rpm). If the answer to the question is affirmative (YES), which means that the engine is operating at a high rotational speed, it is determined that the first and second catalyzers 16 and 17 have been activated due to elevation of the temperature of exhaust gases caused by high speed operation of the engine, and then the program proceeds to the step S8, wherein energization of the heater section 19 is restrained, similarly to the above-mentioned case, i.e. by interrupting the supply of electric power to the heater section 19 or lowering the supply ratio of same, to thereby save the power consumption.

On the other hand, if the answer to the question at the step S3 is negative (NO), the program proceeds to a step S4, wherein it is determined whether or not the intake pipe absolute pressure PBA is higher than a predetermined value PBAX (e.g. 700 mmHg). If the answer to the question is affirmative (YES), the program proceeds to the step S8. More specifically, in the present loop of execution of the program, the engine is in a predetermined high load operating condition, which means that the first and the second catalyzers 16 and 17 have been activated due to elevation of the temperature of exhaust gases caused by high load operation of the engine. Therefore, the supply of electric power to the heater section 19 is interrupted or the supply rate of same is lowered, for saving the power consumption.

Although, in the present embodiment, the load condition of the engine is determined based on the intake pipe absolute pressure PBA, this is not limitative, but the load condition may be determined based on the valve opening $\theta TH$ of the throttle valve 3'. More specifically, if the valve opening $\theta TH$ of the throttle valve 3' detected by the $\theta TH$ sensor is larger than a predetermined value, e.g., if the valve opening of the throttle valve 3' is in a fully open state, it is determined that the engine is operating in a high load condition. Further, the fuel injection amount Tout may be used as a parameter for controlling the heater section, in place of the engine rotational speed NE and/or the intake pipe absolute pressure PBA (or the throttle valve opening $\theta TH$). In other words, the fuel injection amount Tout is determined based on the engine rotational speed NE and the intake pipe absolute pressure PBA, and therefore the fuel injection amount Tout may be selected as a parameter for controlling the heater section. In such a case, the heater section may be controlled, for example, such that if the fuel injection amount Tout is lower than a predetermined value, the heater is operated normally, whereas if the fuel injection amount Tout is higher than the predetermined value, the operation of the heater is restrained, to thereby obtain a similar effect to that described above.

If the answer to the question at the step S4 is negative (NO), which means that the engine is operating at a medium or low rotational speed and at the same time in a medium load condition, the program proceeds to a step S5, wherein it is determined whether or not the ignition timing advance value $\theta IG$ calculated by the above equation (2) is set to a value on the retarded side relative to a predetermined ignition timing advance value $\theta IGREF$ (e.g. BTDC5°). If the answer to the question at the step S5 is affirmative (YES), retardation of the ignition timing advance value $\theta IG$ causes elevation of the temperature of exhaust gases, as is generally known, which in turn causes elevation of the temperature TE of a catalyst bed of the first catalyzer 16. Therefore, the program proceeds to the step S8, wherein energization of the heater section 19 is restrained to prevent deterioration of the catalyzer due to overheating, as well as to avoid degradation of the durability thereof, by interrupting the supply of electric power to the heater section 19 or lowering the supply rate of same.

On the other hand, if the answer to the question at the step S5 is negative (NO), the program proceeds to a step S6, wherein it is determined whether or not an abnormality occurs in any of the above-mentioned various sensors. If the answer to the question is negative (NO), the heater section 19 is operated by normally supplying electric power thereto, followed by terminating the present routine. On the other hand, if the answer to the question at the step S6 is affirmative (YES), to protect the first catalyzer 16, the energization of the heater section 19 is restrained in a similar manner to that mentioned above (e.g. interruption of the supply of electric power or lowering of the supply rate of same), followed by terminating the present routine.

What is claimed is:

1. An exhaust gas-purifying system for an internal combustion engine having an exhaust system, comprising:

catalyzer means arranged in said exhaust system;

heater means disposed to heat said catalyzer means;

heater control means for controlling operation of said heater means; and operating condition-detecting means for detecting operating conditions of said engine;

wherein said heater control means comprises operation-restraining means responsive to operating conditions of said engine detected by said operating condition-detecting means, for restraining operation of said heater means, wherein said operating condition-detecting means includes engine temperature-detecting means for detecting a temperature of said engine, said operation-restraining means restraining the operation of said heater means when the temperature of said engine detected by said engine temperature-detecting means exceeds a predetermined value, wherein said engine temperature-detecting means comprises hydraulic oil temperature-detecting means for detecting temperature of hydraulic oil in said engine.

2. An exhaust gas-purifying system as claimed in claim 1, wherein said engine has at least one intake valve, and at least one exhaust valve, said hydraulic oil is used to operate said at least one intake valve and said at least one exhaust valve.

3. An exhaust gas-purifying system for an internal combustion engine having an exhaust system, comprising:

catalyzer means arranged in said exhaust system;

heater means disposed to heat said catalyzer means;

heater control means for controlling operation of said heater means; and operating condition-detecting means for detecting operating conditions of said engine;

wherein said heater control means comprises operation-restraining means responsive to operating conditions of said engine detected by said operating condition-detecting means, for restraining operation of said heater means, wherein said operating condition-detecting means includes rotational speed-detecting means for detecting rotational speed of said engine, said operation-restraining means restraining the operation of said heater means when the rotational speed of said engine detected by said rotational speed-detecting means exceeds a predetermined value.

4. An exhaust gas-purifying system for an internal combustion engine having an exhaust system, comprising:

catalyzer means arranged in said exhaust system;

heater means disposed to heat said catalyzer means;

heater control means for controlling operation of said heater means; and operating condition-detecting means for detecting operating conditions of said engine;

wherein said heater control means comprises operation-restraining means responsive to operating conditions of said engine detected by said operating condition-detecting means, for restraining operation of said heater means, wherein said operating condition-detecting means includes load-detecting means for detecting load on said engine, said operation-restraining means restraining the operation of said heater means when the load on said engine detected by said load-detecting means exceeds a predetermined value.

5. An exhaust gas-purifying system for an internal combustion engine having an exhaust system, comprising:

catalyzer means arranged in said exhaust system;

heater means disposed to heat said catalyzer means;

heater control means for controlling operation of said heater means; and operating condition-detecting means for detecting operating conditions of said engine;

wherein said heater control means comprises first operation-restraining means responsive to operating conditions of said engine detected by said operating condition-detecting means, for restraining operation of said heater means, wherein said engine has ignition timing control means for controlling ignition timing of said engine, said heater control means including second operation-restraining means for restraining the operation of said heater means when the ignition timing of said engine is controlled by said ignition timing control means to a value on a retarded side relative to a predetermined value.

6. An exhaust gas-purifying system as claimed in any of claims 1, 3 or 4, wherein said operation-restraining means comprises operation-inhibiting means for inhibiting the operation of said heater means.

7. An exhaust gas-purifying system as claimed in claim 5, wherein said second operation-restraining means comprises operation-inhibiting means for inhibiting the operation of said heater means.

8. An exhaust gas-purifying system as claimed in any of claims 1, 3 or 4, wherein said operation-restraining means comprises operation efficiency-reducing means for reducing operation efficiency of said heater means.

9. An exhaust gas-purifying system as claimed in claim 5, wherein said second operation-restraining means comprises operation efficiency-reducing means for reducing operation efficiency of said heater means.

* * * * *